United States Patent [19]

Dove et al.

[11] Patent Number: 4,576,280
[45] Date of Patent: Mar. 18, 1986

[54] HANGING GARMENT CONTAINER

[75] Inventors: Doublas J. A. Dove, Snohomish County; Raymond F. Nelson, King County, both of Wash.

[73] Assignee: Anna Lena Dove, Edmonds, Wash.

[21] Appl. No.: 597,223

[22] Filed: Apr. 5, 1984

[51] Int. Cl.⁴ .......................... B65D 85/18; A47F 7/19
[52] U.S. Cl. ..................................... 206/289; 206/280; 206/282; 206/285; 206/298; 248/216.1; 403/230; 403/232.1
[58] Field of Search .................. 206/9, 279, 280, 282, 206/284, 285, 289, 290, 298, 300; 248/57, 216.1, 220.1; 403/232.1, 230

[56] References Cited

U.S. PATENT DOCUMENTS

| | | | |
|---|---|---|---|
| 625,427 | 5/1899 | Stewart et al. | 403/232.1 |
| 924,842 | 6/1909 | Seipp | 403/232.1 |
| 974,596 | 11/1910 | Randall | 229/41 R |
| 1,097,544 | 5/1914 | Goldberg | 206/280 |
| 1,778,236 | 10/1930 | Trautman et al. | 229/46 |
| 2,112,009 | 3/1938 | Binns | 206/282 |
| 2,116,197 | 5/1938 | Gersten | 206/283 |
| 2,633,979 | 4/1953 | Warnick | 206/291 |
| 2,685,962 | 8/1954 | Druth | 206/279 |
| 2,815,119 | 12/1957 | Field et al. | 206/280 |
| 2,966,708 | 1/1961 | Freeman, Jr. | 403/230 |
| 3,096,923 | 7/1963 | Piller | 229/49 |
| 3,099,379 | 7/1963 | Stease | 229/23 R |
| 3,112,027 | 11/1963 | Field et al. | 206/279 |
| 3,139,978 | 7/1964 | Moglia | 206/291 |
| 3,162,314 | 12/1964 | Belsinger | 206/279 |
| 3,298,503 | 1/1967 | Field et al. | 206/279 |
| 3,357,542 | 12/1967 | Aquino et al. | 206/279 |
| 3,421,614 | 1/1969 | Crane | 206/290 |
| 3,430,759 | 3/1969 | Radel et al. | 206/291 |
| 3,438,562 | 4/1969 | Connor et al. | 220/403 |
| 3,519,139 | 7/1970 | Brennan | 206/279 |
| 3,527,339 | 7/1970 | Cipolla | 206/290 |
| 3,615,110 | 10/1971 | Fugate | 403/230 |
| 3,917,154 | 11/1975 | Dove | 229/23 R |
| 4,034,866 | 7/1977 | Beckwith | 206/279 |
| 4,101,052 | 7/1978 | Dove | 229/23 R |
| 4,111,300 | 9/1978 | Partain | 206/280 |
| 4,196,556 | 4/1980 | Russo | 403/230 |
| 4,318,628 | 3/1982 | Mancini | 403/232.1 |
| 4,411,548 | 10/1983 | Tschan | 403/232.1 |

FOREIGN PATENT DOCUMENTS

| | | | |
|---|---|---|---|
| 164301 | 8/1958 | Sweden | 206/290 |
| 1431122 | 4/1976 | United Kingdom | 403/232.1 |

Primary Examiner—William T. Dixson, Jr.
Assistant Examiner—Brenda J. Ehrhardt
Attorney, Agent, or Firm—Seed and Berry

[57] ABSTRACT

A container for use in shipping garments on hangers has four surrounding walls, preferably, of multiple wall, corrugated kraft board. Dependently connected flaps which form a bottom for the container are arranged to permit shipment of the box in a collapsed condition. An entry flap provided on the front wall of the container is movable between a raised and lowered position. A lid for the container with depending sides is provided. A support structure is provided inside the container. It includes a horizontal support member preferably of wood supported at either end by vertical support members preferably of wood. The support members are held in position by securement plates. The sheet metal securement plates are formed into u-shaped clips which engage the side walls. A central tongue on each clip extends outwardly at an angle. An opening in the tongues receive the horizontal support member. The lower edges of the tongues form and engage in kerfs in the tops of the vertical support members. Prongs or notches in the tongues prevent relative movement of the support members. One embodiment of the tongue structure has openings which captively secure the support members. Several different arrangements for securing the support members together and to the container are provided. Load distribution plates with slippage prevention features support the vertical support members. Ropes are looped over the horizontal support members and knotted at spaced intervals.

51 Claims, 29 Drawing Figures

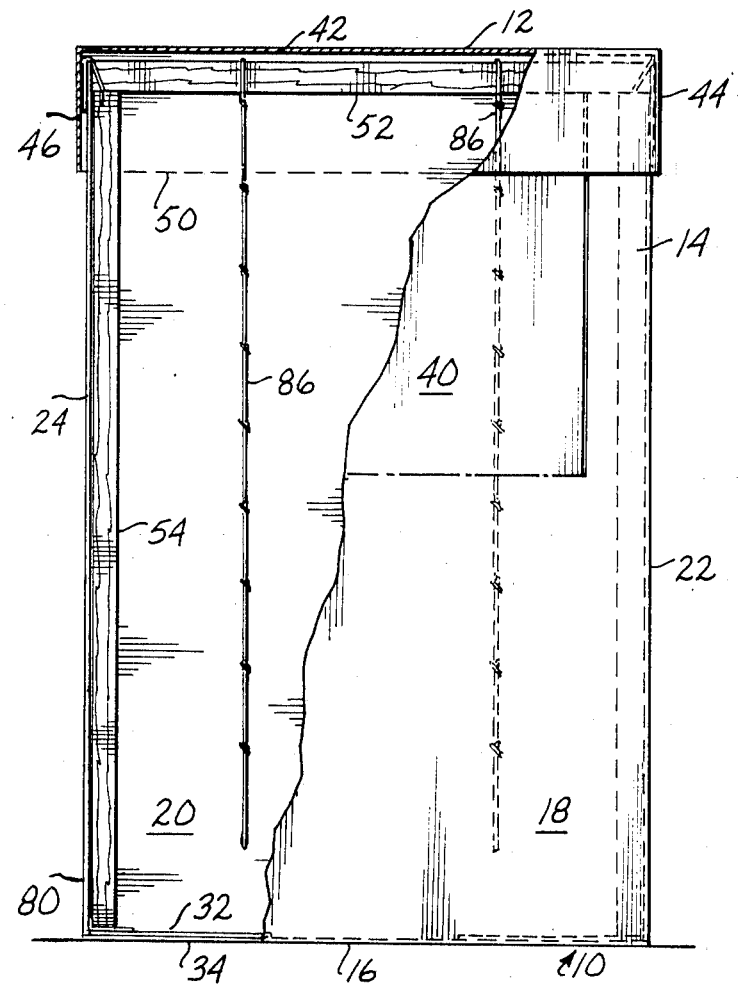
Fig. 3.
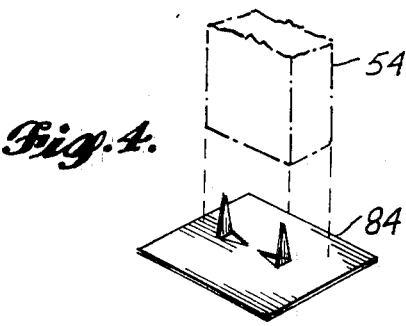
Fig. 4.
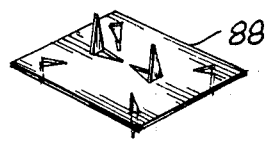
Fig. 5.
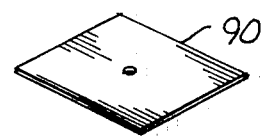
Fig. 6.
Fig. 7.

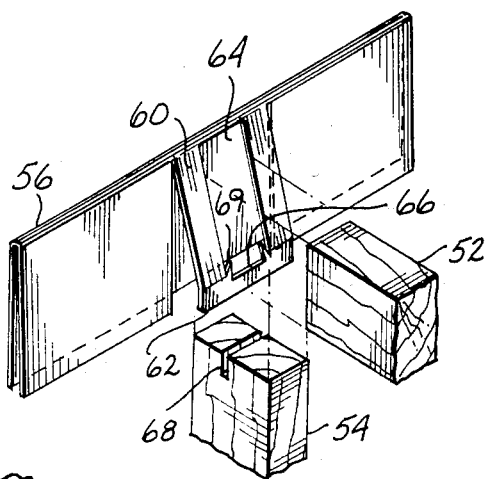
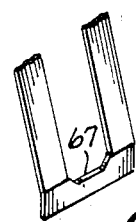
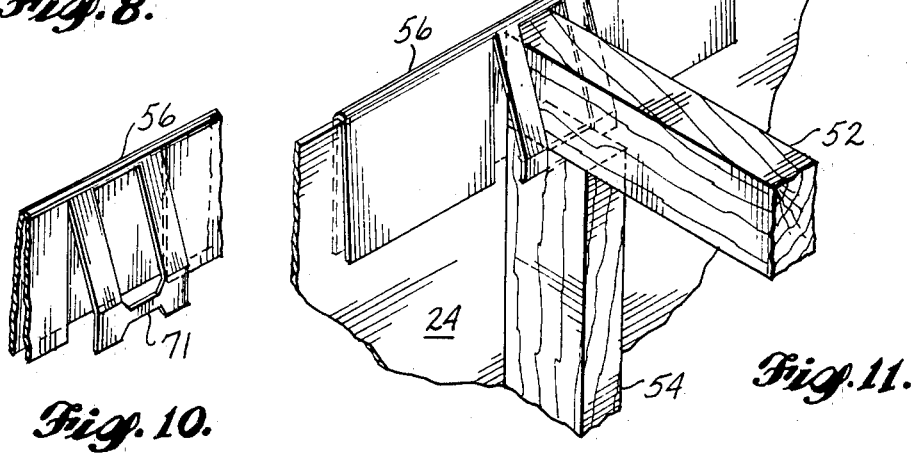
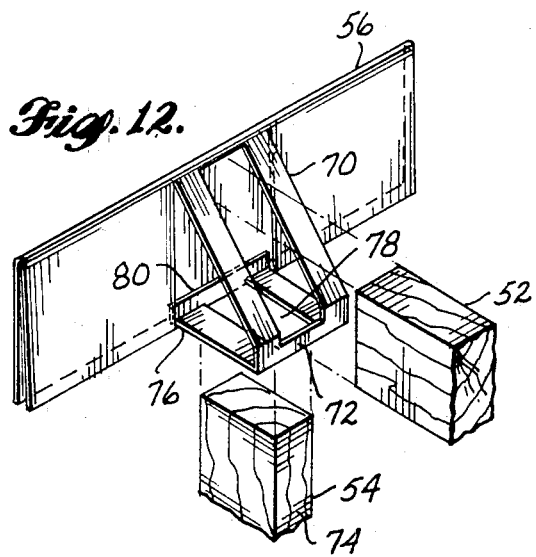
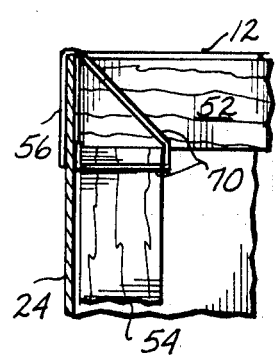

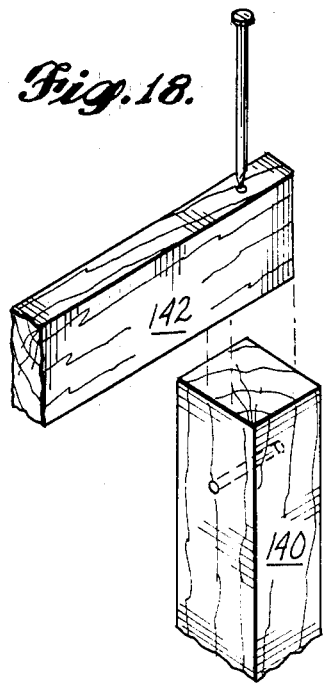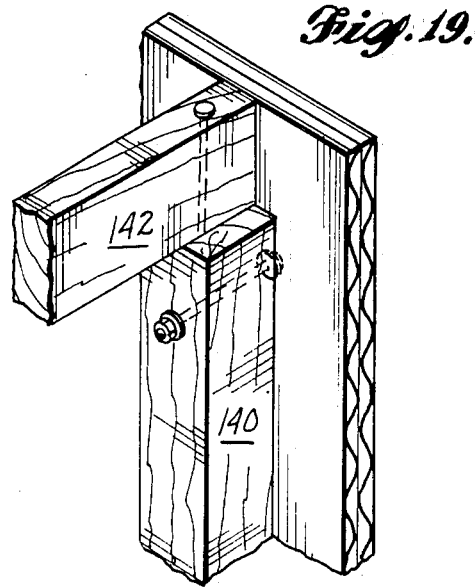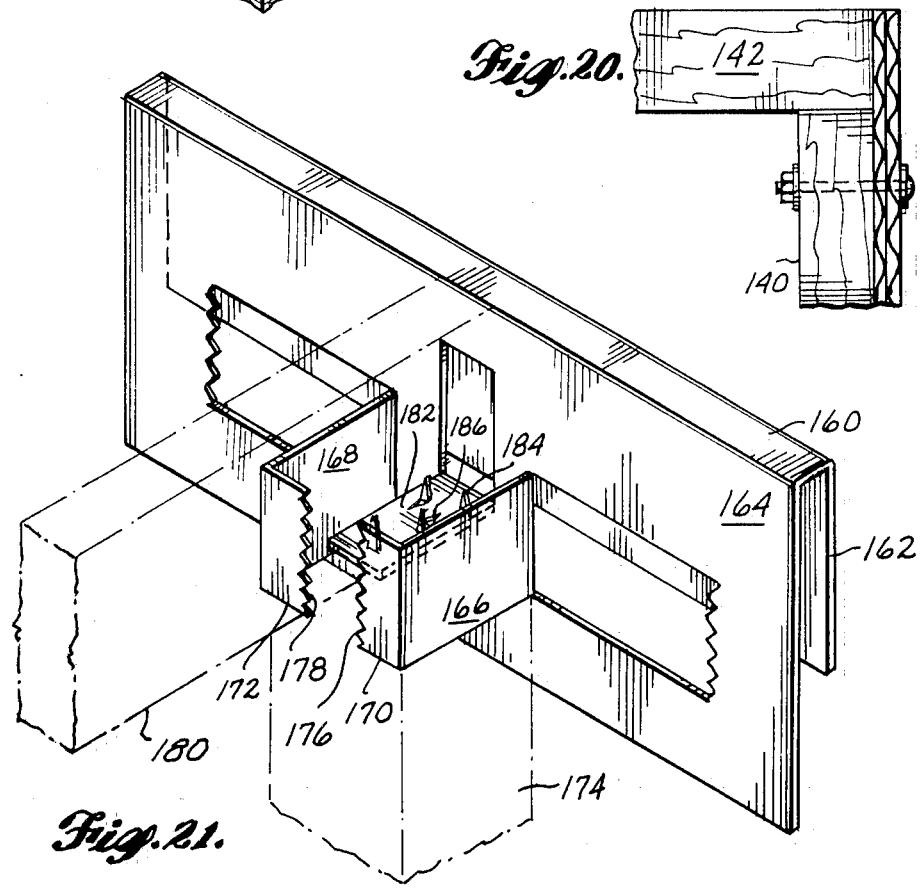

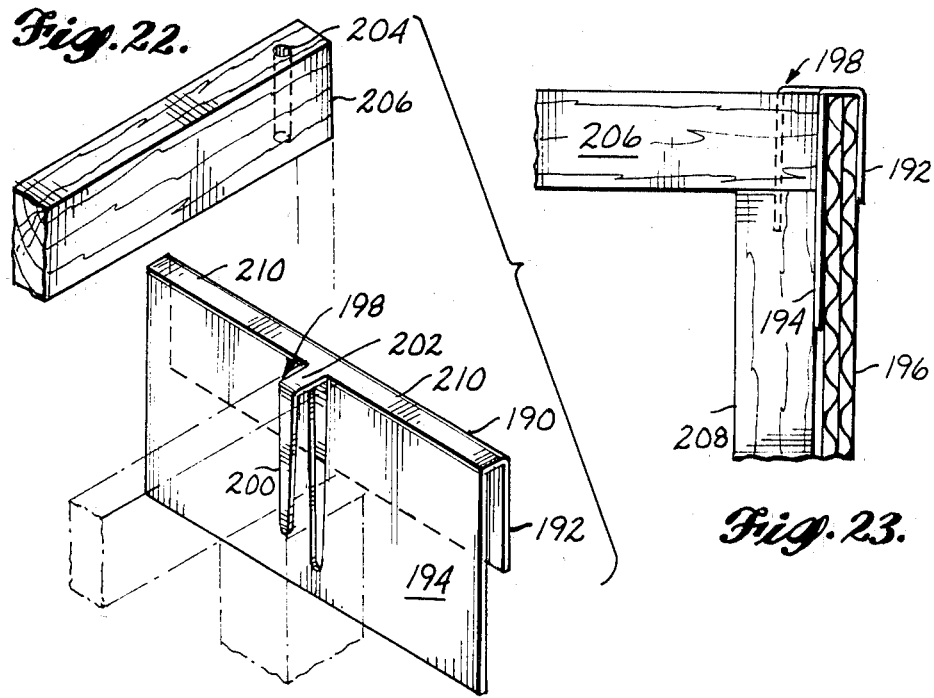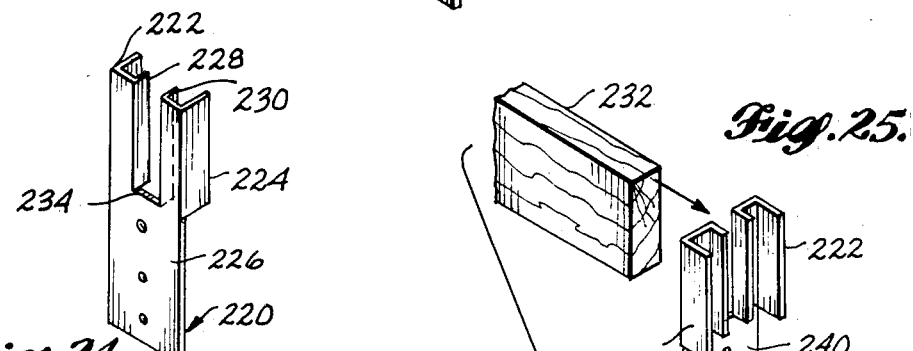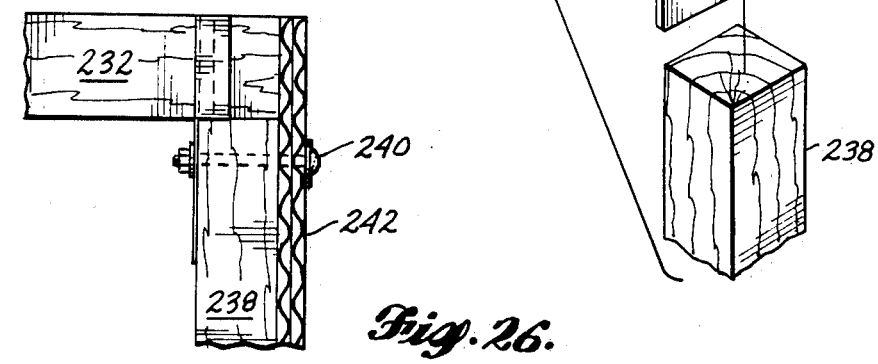

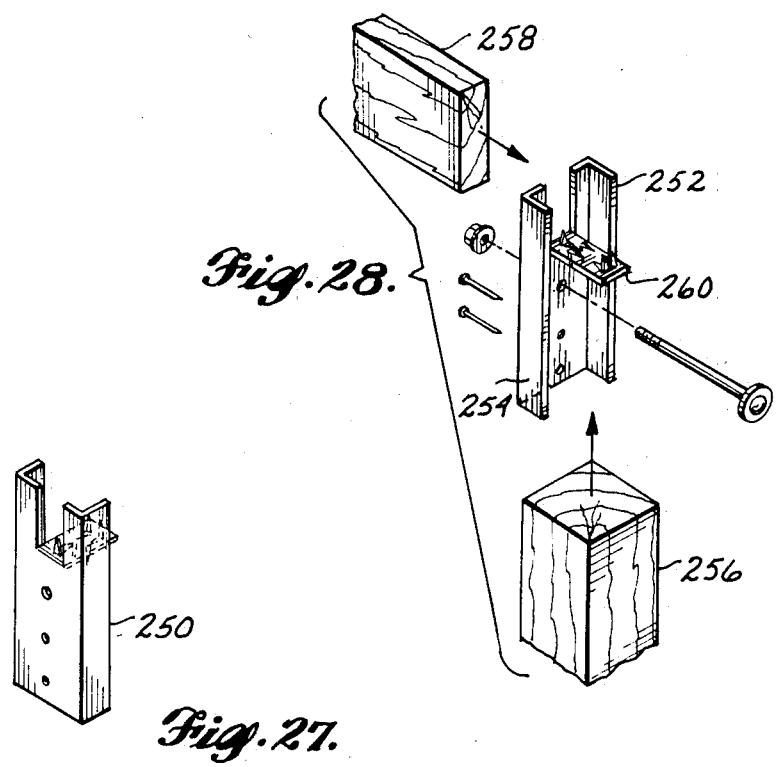
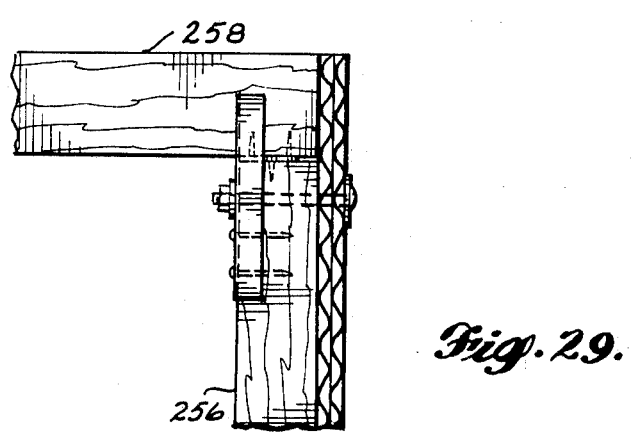

HANGING GARMENT CONTAINER

BACKGROUND OF THE INVENTION

Once an article of clothing is manufactured the garment may have to be shipped a considerable distance by land, sea or air to the retail outlet. In the course of shipment the garments or the containers may be handled many times during the distribution process and may be exposed to wide variations in temperature and humidity. A preferred way to ship garments is to ship them on hangers from the factory. This is known as "Garments On Hangers" or "GOH" shipping. This has the advantage of reducing the wrinkling of the garments as well as reducing the number of times a garment must be handled where it is ultimately to be displayed on a hanger at the retail outlet.

GOH has contined to receive escalating attention for two basic reasons:

1. The cost of "flat pack" or packing garments flat into corrugated containers has risen dramatically, and 2. The cost of labor to stem and press, if necessary, and place on hangers for sizing, marking and pricing and final distribution, is going up.

In order to keep costs down, the less the garment is handled, the less costly the product will be.

Today shipping lines are faced with decisions on whether to specially outfit large containers, commonly called ocean containers, for GOH which is very costly. This makes the equipment specialized, putting severe logistical restraints on the ocean containers since it must travel between two points only—origin and destination—and cannot be used in system-wide trade like other standard shipping containers.

If a shipping line decides not to invest in permanent GOH ocean containers, their alternative is to temporarily alter a standard ocean container to a GOH ocean container by subcontracting for the installation of temporary rigging. A difficulty with this process is that it is expensive to set up the rigging and it must be then removed at the end of the voyage so that the ocean container can be utilized for other types of cargo. Rigging an ocean container can range in cost from $700.00 in Hong Kong per forty-foot ocean container to $900.00 per forty-foot ocean container in Taiwan.

Many times this rigging is discarded at its destination which allows the ocean containers to again be utilized system-wide in its standard mode. Because of these considerations, both operationally and economically, shipping lines have discouraged the marketing of Garment On Hangers (GOH).

Another alternative has been to use specially designed containers which contain racks for receiving the hangers. These are smaller containers which are then loaded within the twenty foot or forty foot standard ocean containers. The problem with this type of container is that it is rather expensive. Further in many cases it is not collapsible or is only partially collapsible when shipped to its initial point of use. Also it is generally too expensive to return the container empty for another load.

SUMMARY OF THE INVENTION

The invention relates to a container for use in shipping garment on hangers. The container, in its preferred form, has four surrounding walls of double wall, corrugated kraft board. Dependently connected flaps in the form of extensions of the walls are provided to form a bottom for the container. The flaps are designed and arranged to permit shipment of the box to its point of initial use in a collapsed condition. An entry flap is provided on the front wall of the containers. The entry flap is movable between a raised and lowered position. A lid for the container is provided and has downwardly depending side panels. A support structure is provided inside the container. It includes a horizontal support member supported at either end by vertical support members. These are preferably of wood. The support members are held in position by securement plates positioned at the intersections of the horizontal member and the vertical members. The securement plates are preferably of sheet metal formed into u-shaped clips which engage the upper edges of the side walls. The clips are provided with central tongues which extend outwardly at an angle. Openings in the tongues receive the horizontal support member. The lower edges of the tongues form and engage in kerfs in the top of the vertical support members. Prongs or notches are provided in the tongues which bind into the support members to prevent relative movement. One embodiment of the tongue structure captively secures both the vertical support member and the horizontal support member. Several alternative arrangements for securing the support members together and to the container are provided. Load distribution plates are provided at the foot of the vertical support members. Provisions are made to prevent the slippage of the plates relative to the vertical support members and the bottom of the container. Ropes are looped over the horizontal support members and knotted at spaced intervals. The hangers supporting the garments are inserted between the knots.

DESCRIPTION OF THE DRAWINGS

FIG. 3 is a side elevation view of the container with a portion of the front wall broken away to expose the interior of the container.

FIG. 4 is an exploded, perspective view of a second embodiment of the vertical support, foot plate.

FIG. 5 is an enlarged, perspective view of a third embodiment of the vertical support, foot plate.

FIG. 6 is an enlarged, perspective view of a fourth embodiment of the vertical support, foot plate.

FIG. 7 is an enlarged, perspective view of a fifth embodiment of the vertical support, foot plate.

FIG. 8 is an enlarged, exploded, perspective view of the support securement plate illustrating the connection of the horizontal and vertical support members.

FIG. 9 is an enlarged, perspective view of the tongue of a second embodiment of the support securement plate illustrating an alternative tongue structure.

FIG. 10 is an enlarged, partial, perspective view of a third embodiment of the support securement plate illustrating an alternative tongue structure.

FIG. 11 is an enlarged, perspective view of the first embodiment of the support securement plate engaged over the top edge of the container body and engaging the vertical and horizontal support members.

FIG. 12 is an enlarged, perspective view of a fourth embodiment of the support securement plate illustrating an alternative tongue structure.

FIG. 13 is an enlarged, partial side elevation view, in section, of the top corner of the container at the side wall illustratng the installation of the fourth embodiment of the support securement plate.

FIG. 18 is a partial, exploded, perspective view of a simplified version of the embodiment illustrated in FIGS. 15 and 16.

FIG. 19 is an enlarged, partial, perspective view of the embodiment illustrated in FIG. 18.

FIG. 20 is a partial, side elevation view, in section, illustrating the embodiment shown in FIGS. 18 and 19.

FIG. 21 is an enlarged, perspective view of an alternative embodiment of the support securement bracket.

FIG. 22 is an exploded, perspective view of an alternative embodiment of the horizontal support member and securement bracket.

FIG. 23 is a partial side elevation view, in section, of the embodiment illustrated in FIG. 22.

FIG. 24 is a perspective view of an alternative embodiment of a securement bracket.

FIG. 25 is an exploded, perspective view of the bracket of FIG. 24 illustrating its connection to the vertical and horizontal members.

FIG. 26 is a partial, side elevation view, in section, of the embodiment illustrated in FIGS. 24 and 25.

FIG. 27 is a perspective view of an alternative embodiment of a securement bracket.

FIG. 28 is an exploded, perspective view of the bracket of FIG. 27 illustrating its connection to the vertical and horizontal members.

FIG. 29 is a partial, side elevation view, in section, of the embodiment illustrated in FIGS. 27 and 28.

DETAILED DESCRIPTION OF THE INVENTION

Figure 1:
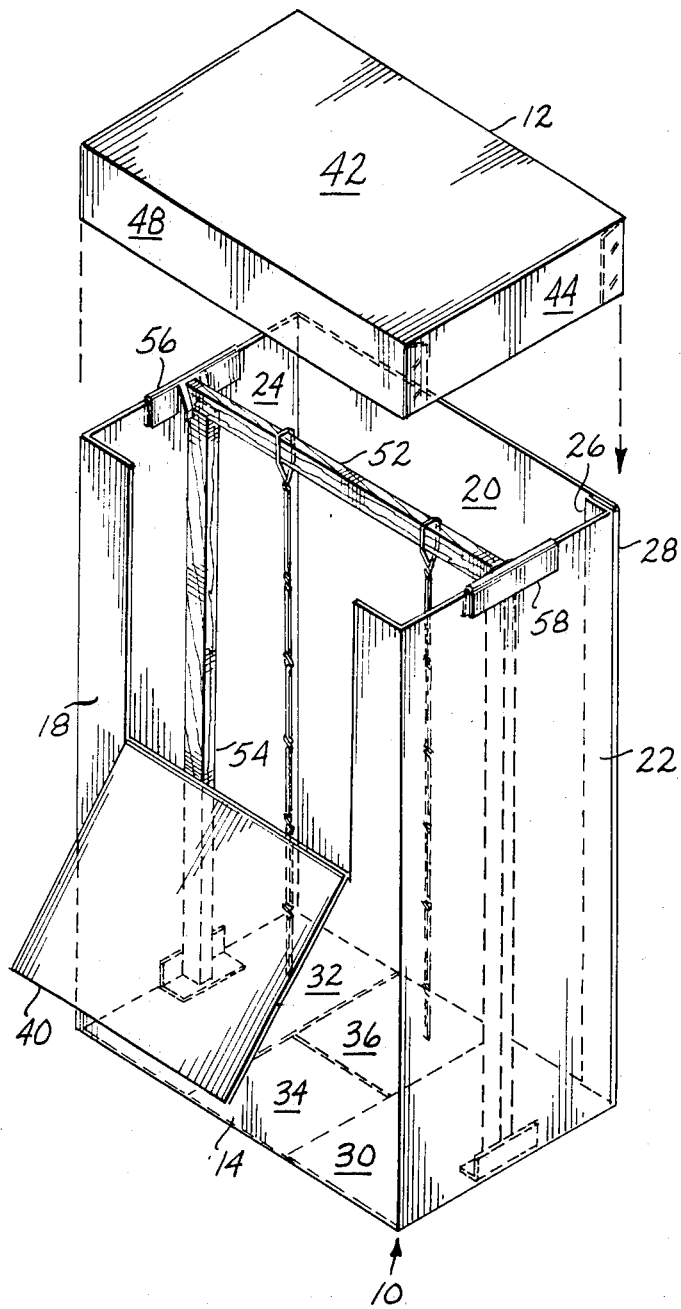
FIG. 1 is a perspective view of the preferred embodiment of the container with the lid in a raised position and the flap, access door shown in the lowered position.

The invention relates to a container 10 which is used in its most common application, to transport a large number of garments on hangers. In its most common application it will be used to transport garments from the manufacturer to the retailer's distribution center or a distribution center serving several stores or to individual retail outlets. The containers when shipped overseas will generally be stacked within a conventional twenty foot or forty foot ocean container or the like. Since wearing apparel is commonly manufactured in countries with a high relative humidity, the containers are adapted to withstand problems created by the exposure to moisture.

The container itself is preferably constructed of a multi-layer, corrugated kraft board or similar material. Preferably 600 pound double wall, water repellent board, designated 90 V/90 V/90 V board. The board has three 90 V water repellent board liners separated by two layers of 33 pound high humidity, corrugated medium and joined with a water proof adhesive.

The container has a top 12 and a lower 14 section.

The lower section 14 has a planar lower wall 16 to which is dependently connected upstanding front wall 18, rear wall 20 and side walls 22 and 24. Preferably the entire lower section is formed from a single sheet of board. The board is scored vertically to define the front wall, rear wall and side wall sections and a depending corner flap 26. The corner flap is permanently fastened to the edge 28 of the abutting rear wall. The container is provided with an enclosing bottom structure which permits the container to be shipped to its point of initial use in a collapsed condition. Preferably a series of four horizontal scores define flaps 30, 32, 34 and 36 which depend from corresponding side walls. These flaps are all of equal length and are folded up to form the planar bottom of the container. To permit traveling to the point of initial use in a collapsed, or knocked down (KD), condition the bottom flaps are not initially secured together so that the lower section may be collapsed to a flat configuration when the bottom flaps are each position parallel to the wall panel from which it depends. The bottom flaps are secured together either by stitching, i.e. staples, gluing or with water resistant tape when the container is erected at the point of initial use.

An entry flap 40 is formed in the upper portion of the front wall 18 of the container. The entry flap is formed by providing a horizontal scored fold line in the front wall panel and cutting the front wall panel vertically on either side so that the sides of the flap are free near the corners of the container. This permits the flap to be folded downward for access to the interior of the container as shown in FIG. 1. Preferably the vertical cuts are made about five inches in from the adjacent corners of the container. The flap is secured in an upright position when the lid 12 is on the container. The entry flap facilitates the introduction or removal of garments from the container. This flap, once the container is filled, is normally taped to the body thus totally sealing the container.

The lid 12 in its preferred form, is of a conventional configuration. It includes a planar top panel 42, downwardly depending side panels 44 and 46, and front and rear depending panels, 48 and 50, respectively. The side panels and end panels are joined at the corners in a conventional manner, such as through the use of overlapping tabs such as those illustrated in FIG. 1, or the like.

The container is preferably 19⅜" deep, 28⅜" wide and 45" high. The containers are sized so that they can be stacked two high in a standard twenty foot or forty foot ocean container or the like.

A support structure is provided in the interior of the container to support the garments on hangers. This support structure includes a horizontal support member 52. The ends of the horizontal support member extends between the interior surfaces of the side walls 22 and 24. The ends of the horizontal support member 52 are supported by a pair of vertical support members 54. These support members are preferably made of wood, such as hemlock or fir, and are preferably rectangular in cross section and have a ¾ inch × 1½ inch cross-section.

The support members are held in position and load forces are distributed along the top edge of the lower section of the container by securement brackets, such as securement plates 56 and 58. The preferred form of the securement plates are illustrated in FIGS. 8 and 11. The plates are preferably formed of twenty-two gauge, cold rolled sheet steel. Because of the exposure to moisture the sheets are preferably galvanized such as through the process commonly called galvannealing then, optionally, painted to prevent rust from soiling the garments. The steel is bent to form a u-shaped clip which engages the upper edge of the side walls of the container. The clip is also preferably relatively wide to distribute the load forces over a relatively long section of the top edge of the container side wall. The clip thus takes the form of two joined plates mutually securing the other in position against the container wall. Their relative sizes may vary. Punched prongs, like those illustrated in FIG. 7, may be provided on the clip. These prongs, not shown, engage the side wall of the container and prevent the clip from sliding along the top edge of the side wall. Sliding movement is also prevented by the clamping action of the sides of the clip, as well as, by deformation under loading of the section of the top edge of the side wall contacted by the clip. A central tongue 60 is formed on one side of the securement plate by cutting one side of the clip vertically at spaced intervals. The tongue is then bent outward at an angle. The lower edge 62 of the tongue is preferably bent downward to form a vertical section. The central portion of the tongue is removed and provides an opening 64 which closely receives the end of the horizontal support member. When the horizontal support member is in position within the securement plate it is prevented from rotating by the lateral interior margins of the opening 64. The lower surface of the horizontal support member rests on the upper edge 66 of the lower section of the tongue. The lower edge of the tongue, when the securement plate is first installed, rests on the top end of the vertical support member 54. The weight of the horizontal member and loads placed on it form a kerf 68. This kerf serves to secure the vertical support member against movement. High atmospheric humidity facilitates the formation of the kerf without the risk of splitting the wood. The kerf may be pre-formed if desired. Forces tending to pull the sides of the box apart are resisted by the top edge 66 of the clip biting into the lower surface of the horizontal support member. Forces tending to push the sides of the box inward are resisted by the contact with the end surfaces of the horizontal support member.

In order to prevent relative movement of the securement plates and the horizontal member, integral, upward projecting prongs 69 are provided. They have sharp points which help to hold the horizontal member in place even prior to loading the member. Further loading secures the horizontal member more rigidly.

An alternative structure performing this securement function is illustrated in FIG. 9. In this version a notch 67 is provided in the upper edge of the downturned end section of the tongue. The notch has sloped corners. These corners form high stress points which bind into the horizontal members. They bind even under the weight of the horizontal member alone and bind into the horizontal member more heavily upon loading.

A further alternative structure performing the securement functions between the horizontal and vertical members is illustrated in FIG. 10. On this embodiment the tongue has an upper notch on the upper edge of the downturned end section of the tongue. This embodiment has a similar notch 71 which performs similarly on the bottom edge of the downturned end section.

An alternate form of a support bracket is illustrated in FIGS. 12 and 13. It differs from the previous embodiment described above by the form of its central tongue 70. The central tongue extends outward farther from the body of the securement plates so that the downturned end section 72 engages the side 74 of the vertical support member 54. Extending beyond the lower edge of the downturned section is an inwardly directed, horizontal portion 76 of the tongue. This horizontal section has a central opening 78. The opening is bounded on its end opposite end section 72 by upturned end 80. The opening 78 closely receives the upper end of the vertical support member 54.

Figure 2:
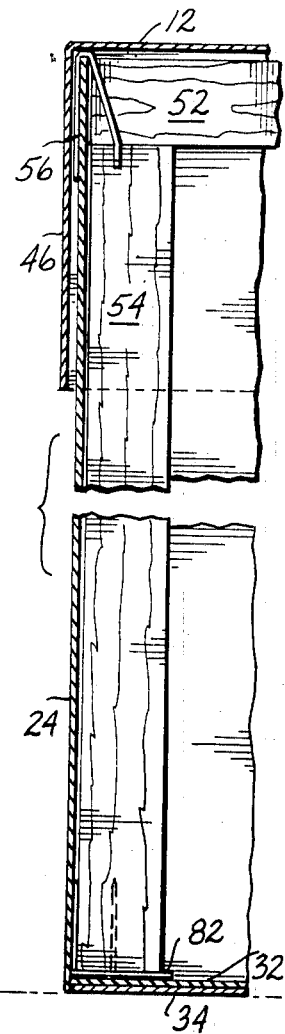
FIG. 2 is an enlarged, partial, side elevation view in section of the container, with portions removed.

In order to prevent the bottom ends of the vertical support members from moving away from the wall and laterally, as well as, to distribute the load forces over a larger area, plates 82 are preferably provided, as shown in phantom in FIGS. 1 and 2. The plates are preferably formed of metal like securement plates 56 and 58. Plywood or other material may be used. In the version illustrated in FIGS. 1 and 2 the plates have a planar horizontal section and an upturned edge which abuts the side wall of the container. They are held in position such as through the use of a nail passing through a hole provided in the plate and extending into the end of the vertical support member as shown in FIG. 2.

An alternative form of support plate is illustrated in FIG. 4. In this version the plate 84 is flat except for punched prongs which extend upward into the end of the vertical support member. This version does not have an upturned edge in order to minimize the thickness of the part for shipment with the container in a collapsed condition.

An alternative plate structure 88 is shown in FIG. 5. It is similar to plate 84, but has a series of downwardly directed, punched prongs. The prongs will be imbedded in the bottom of the container to prevent movement of the lower end of the vertical members.

Another plate structure 90 is illustrated in FIG. 6. This plate is like plate 82, shown in FIG. 2, except that the upturned edges are omitted. The nail hole is illustrated more clearly in this embodiment.

The plate 92, illustrated in FIG. 7, is like that illustrated in FIG. 6 with the addition of the slippage prevention feature provided by downturned, integral prongs.

The weight of loads placed on the horizontal support member and transfered through to the vertical support members to the plates cause the plates to imbed themselves in the slightly compressable bottom of the container. This prevents movement of the lower end of the vertical support members.

Garment support ropes 86 are provided at intervals along the horizontal support member 52. The support ropes are looped over the bar and knots securing the two rope segments together are placed at spaced intervals. The intevals between knots preferably are from 4 to 6 inches. The strands between the knots are separated to insert the hanger hooks. Clothing is distributed on hangers along the support ropes. The containers are packed with garments so that the garments substantially fill the container to minimize swinging on the support ropes. The ropes tend to bind into the horizontal support member and prevent their movement along the member.

Figure 14:
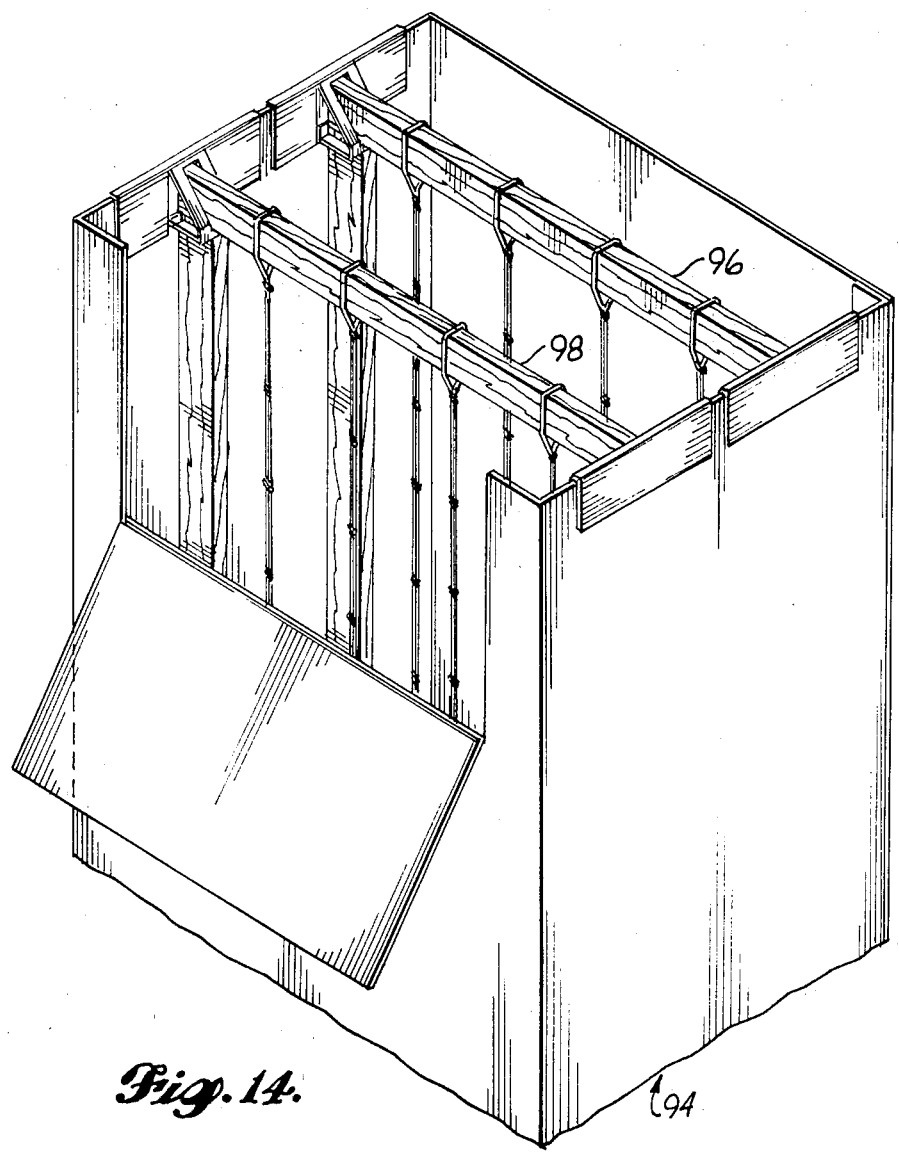
FIG. 14 is a partial, perspective view of a second embodiment of the container which has a pair of horizontal support members.

FIG. 14 illustrates a larger embodiment 94 of the container having two parallel horizontal support members 96 and 98. The preferred dimensions of this container would be 36 inches deep, 45 inches wide and 46 inches high. The securement plates are preferably constructed like those shown in FIGS. 12 and 13. The support members in this embodiment are preferably made from 2×4's.

Figure 15:
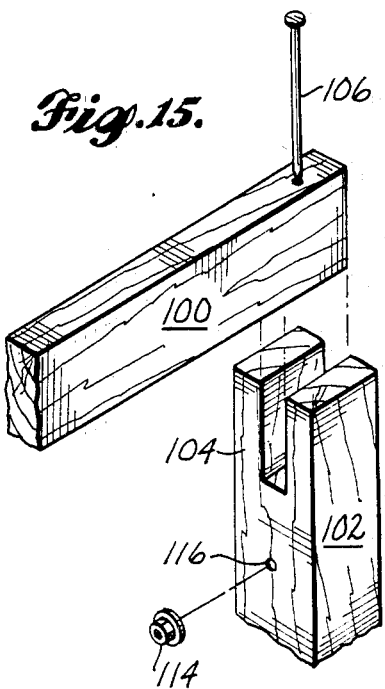
FIG. 15 is an enlarged, exploded, perspective view of an alternative for securing the horizontal support member, vertical support members and the container together.
Figure 16:
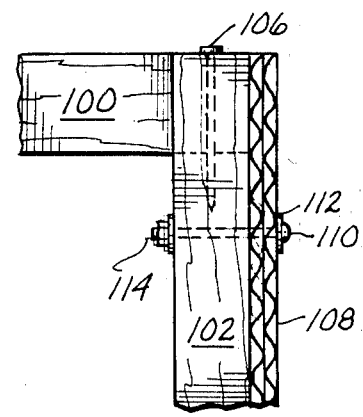
FIG. 16 is an enlarged, partial, side elevation view, in section, of the embodiment shown in FIG. 15.

FIGS. 15 and 16 illustrate alternative embodiments of the horizontal support member, vertical support members and a method of securing them against movement relative to each other and relative to the container. In this embodiment the horizontal support member 100 has a smaller transverse width than the vertical support member 102. By way of example the horizontal support member would measure ¾ inch by 2½ inches in cross-section and the vertical support member 2 inches by 2 inches. The horizontal support member is closely received within a slot 104 formed in the top of the vertical support member. The two members are then secured together, such as by the use of a fastener, such as nail 106. The nail extends through the horizontal member and into the vertical member. In order to secure the vertical member in an upright position, the vertical support member is fastened to side wall 108 of the container. It may be fastened by stitching, i.e. stapling, gluing or using fasteners, such as bolt 110 carrying washer 112 and secured by friction nut 114 or the like. The bolt extends through the container side wall and through a hole, preferably pre-drilled, in the vertical support member 102. A hole in the side wall to receive the fastener is preferably formed in the side wall of the container during manufacture.

Figure 17:
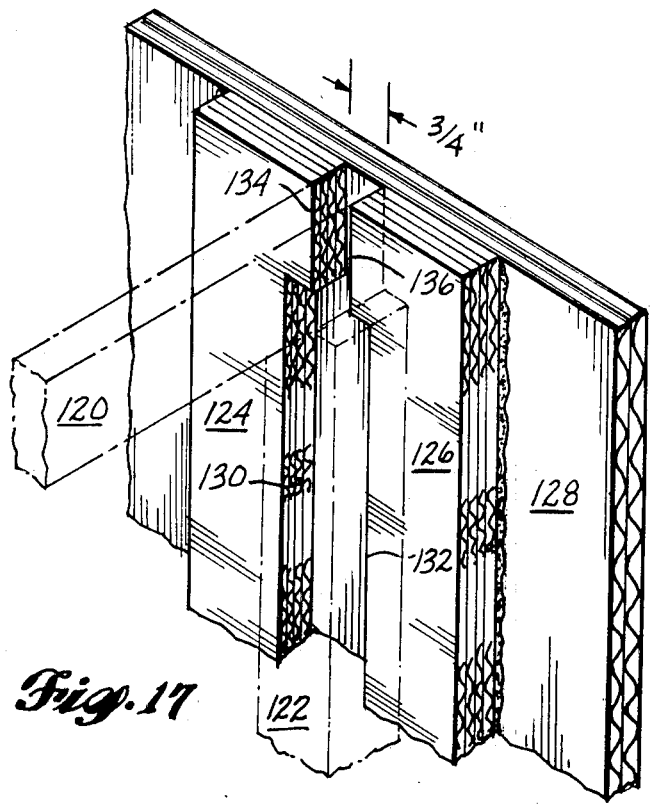
FIG. 17 is an enlarged, partial, perspective view of an alternative structure for securing the vertical and horizontal support members.

FIG. 17 illustrates an alternative structure for securing the vertical and horizontal support members against movement relative to each other and relative to the side walls of the container. In this embodiment the horizontal support member 120 is also preferably sized smaller in transverse width than the vertical member 122, preferably ¾ by 2½ inches and 2 by 2 inches respectively. Two opposing segments 124 and 126 are secured the side wall 128 of the container. Preferably these take the form of double layers of triple wall corrugated board. The segments are secured, such as by gluing them, to the inside of the side wall of the container. The segments have lower interior edges 130 and 132 respectively which form a slot which closely receives the upper end of vertical support member 122 in a force fit relationship. The upper interior edges 134 and 136 respectively project further inward and closely receive the end of the horizontal support member 120 also in a force fit. While the segments are preferably made from corrugated board other materials may be used. Preferably those other materials are deformable and resilient like the multi-layered board so that they can deform to receive the support members in a force fit and resiliently hold them in position.

FIGS. 18, 19 and 20 illustrate a simplified version of the embodiments illustrated in FIGS. 15 and 16. In this embodiment the top of the vertical support member is flat and provides a resting point for the horizontal support member 142.

FIG. 21 illustrates another alternative embodiment of a support member securement bracket. The securement plate 160 is preferably formed of a single piece of material, such as sheet metal like that described above. It, preferably, has two opposing panels 162 and 164 which captively engage the side wall of the container. Opposing tabs 166 and 168, having vertically oriented walls are preferably integrally formed from plate 164 by punching. The portions of the tabs nearest the plate project outwardly from the plate 164. Projections 170 and 172 extend towards each other on the end of the tabs 166 and 168. The tabs form a structure which captively engages and surrounds the top of the vertical support member 174. Rows of teeth 176 and 178 are preferably formed on the ends of the tabs when they are formed. The tabs are preferably sized so that the distance between the opposing rows of teeth 176 and 178 is slightly smaller than the width of the horizontal support member 180. The teeth are angled so that the horizontal support member can be inserted from above and forced between the rows of teeth but removal in the upward direction is thereafter inhibited by the tooth structure. The spring action of the tabs further enhance the capturing of the end of the horizontal support member. As an alternative, or in addition, the securement plate is provided with tab 182, preferably also integrally formed and having horizontally oriented walls. It is preferably formed by punching plate 164 and bending the formed tab 182 outward at a 90° angle. Preferably the tab is positioned such that it contacts the top of the vertical support member and the lower surface of the horizontal support member. Relative movement of the support members with respect to the tab are prevented by projections, such as the four integral punched prongs 184 which project upwardly into the horizontal support member and the two integral, punched prongs 186 which project downwardly into the top of the vertical support member.

FIGS. 22 and 23 illustrate alternative embodiments of the horizontal support member, vertical support members and the securement brackets. In this embodiment the securement plate 190, like other securement plates, has two opposing plates 192 and 194 which captively engage the side wall 196 of the container. It is preferably made of metal, like those described above. A projection 198, preferably integrally formed, extends outwardly from the top of the securement plate. The projection has a downturned end forming leg 200. The projection is preferably centrally located on the securement plate. It is also preferably provided with stiffening ridge 202. The downturned leg 200 is adapted to be closely received within a vertical hole 204 in the end of the horizontal support member 206. The downturned leg of the projection is made of such a length that it will project into the top end of the vertical support member 208. It is also preferably tapered so that it may be driven into a wooden support member. To install the securement member the horizontal support member is placed in position on top of the vertical support member. The longer, inner plate 194 is placed between the support members and the sidewall 196 of the container. The securement plate is then forced downward with the downturned leg passing through hole 124 in the horizontal support member. When the end of the downturned leg engages the top of the vertical support member the securement member is forcibly driven downward embedding the end of the downturned leg into the top of the vertical support member. Alternatively a pre-drilled hole may be provided in the top of the vertical support member to receive the leg 200. To inhibit movement of the securement member along the upper edge of the container side wall provisions, such as the integral, inwardly projecting prongs 210 may be provided.

FIGS. 24, 25 and 26 illustrate another alternative embodiment of the securement bracket. The securement bracket, preferably, is in the form of a securement plate 220. It is preferably formed from a single piece of sheet metal, like those described above. The upper portion of the bracket is provided with two outer stiffening flanges 222 and 224. These flanges extend transversely with respect to the main body 226 of the plate 220. Two inner flanges 228 and 230 are bent inwardly in a similar fashion. The inner flanges form a slot which receives the end of the horizontal support member 232. The inner flanges are preferably directed slightly inward in order to create a clamping force to secure the horizontal support member against withdrawal and movement once inserted. The bottom edge of the inner flanges 222 and 224 are preferably flat and bear against the top of the vertical support member. The bottom edge 234 of the slot bears upward against the bottom of the horizontal support member 232 to bind and further restrict its movement. This edge may be provided with serrations or the like to further inhibit the relative movement. The body 226 of the plate is provided with holes 236 through which fasteners, such as nails, may pass in order to secure the support plate to the vertical support member 238. An additional hole 240 is provided in the body 226 to permit the passage of a fastener 240 which secures the assembly to the side wall 242 of the container.

FIGS. 27, 28 and 29 illustrate another embodiment of the securement bracket. The bracket is preferably formed of plate 250 of metal like those described above. The plate has transversely directed lateral flanges 252 and 254. The vertical support member 256 is captively received between the flanges. The bracket is secured to the vertical support member and to the adjacent side wall of the container like the previously described embodiment. In order to form a slot in the plate 250 for receiving the horizontal member 258 at integral tab 260 is formed by bending a segment of the plate at a 90° angle. Upwardly projecting prongs are provided on the top surface of the tab to engage the lower surface of the horizontal support member. Downwardly projecting prongs are provided on the under surface of the tab to engage the top of the vertical support member.

Conventional containers for hanging garments typically can carry only 55 to 60 pounds of garments on hangers. A container constructed according to the invention can handle approximately 200 pounds of garments without failing structurally.

While this invention has been described in conjunction with certain specific embodiments of the container and applications of the container, it should be understood that these are merely illustrative. Numerous modifications and alterations may be made to the container and in its use without departing from the spirit and scope of the invention and it is intended that the patent shall cover whatever features of patentable novelty exist in the invention and are encompassed within the following claims.

We claim:

1. A hanging garment container comprising:
    (a) a panel structure forming a front wall, a rear wall and a pair of opposite side walls connecting the front and rear walls and having a connected planar bottom structure for the container to create an open top container;
    (b) a hanging garment support structure including a horizontal support member extendable across the top of the open top container between opposite side walls;
    (c) a pair of vertical support members each for supporting an opposite end of the horizontal member and each supportable on the bottom of the open top container at their lower ends; and
    (d) means for securing the ends of the horizontal member to the side walls to prevent relative movement and for securing the tops of the vertical members to prevent relative movement wherein the securement means comprises a pair of brackets, one at each end of the horizontal support member, each bracket connected to one of the vertical support members, and each bracket simultaneously securing the horizontal support member to the associated side wall and securing the top of the associated vertical support members against movement relative to the horizontal member.

2. A hanging garment container, as claimed in claim 1, further comprising a pair of weight distribution plates each securable to the lower end of a vertical support member in order to distribute loads carried by the vertical support members wherein each weight distribution plate includes an upward projecting punched prong for securing the weight distribution plate to the end of the associated vertical support member, includes a downward projecting punched prong for securing the weight distribution plate to the bottom of the container to prevent relative movement, and is sized to be substantially narrower in width than the container.

3. A hanging garment container, as claimed in claim 1, wherein the support member securement means comprises a bracket having a panel positionable on the interior of a side wall of the container, means for securing the bracket panel to the side wall of the container, and an tongue connected to and projecting from the bracket panel which engages the horizontal support member and a vertical support member.

4. A hanging garment container, as claimed in claim 3, wherein the support member securement bracket further comprises a tongue having a central opening therein which closely receives an end of the horizontal support member.

5. A hanging garment container, as claimed in claim 4, wherein the central tongue of the support securement bracket extends angularly outward from the bracket panel and has a down turned end which engages the top of the vertical support member to form a kerf therein.

6. A hanging garment container, as claimed in claim 4, wherein the tongue has a lower section along the bottom of the central opening which includes means for securing the horizontal support member to prevent relative movement.

7. A hanging garment container, as claimed in claim 6, wherein the horizontal support member securement means on the tongue comprises an integral prong which engages the horizontal support member.

8. A hanging garment container, as claimed in claim 6, wherein the horizontal support member securement means on the tongue comprises an upper edge of the lower section of the tongue defining a notch which has sloped corners which bind into the horizontal support member.

9. A hanging garment container, as claimed in claim 4, wherein the tongue has a lower section which includes means for securing the vertical support member to prevent relative movement.

10. A hanging garment container, as claimed in claim 9, wherein the vertical support member securement means on the tongue comprises a lower edge of the lower section of the tongue which defines a notch having sloped sides which bind into the vertical support member to prevent relative movement.

11. A hanging garment container, as claimed in claim 3, wherein the tongue on the support member securement bracket includes a section outwardly projecting from the bracket panel and having a lateral opening therein for closely receiving an end of the horizontal support member and a horizontal section in said tongue connected to the outwardly projecting section and having an opening therein for closely receiving the top of a vertical support member.

12. A hanging garment container, as claimed in claim 1, having a pair of parallel, horizontal support members extendable across the top of the open topped container between opposite side walls and each having an associated pair of vertical support members for supporting opposite ends of the associated horizontal member and supportable on the bottom of the open topped container at the lower ends and each including an associated means for securing the ends of the associated horizontal member to the side walls to prevent relative movement and for securing the tops of the associated vertical members to prevent relative movement wherein each securement means comprises a pair of brackets, one at each end of the associated horizontal support member, each bracket connected to one of the associated vertical support members, and each bracket simultaneously securing the associated horizontal support member to the associated side wall and securing the top of the associated vertical support member against movement relative to the horizontal member.

13. A hanging garment container, as claimed in claim 1, wherein the side walls of the container are dependently connected and there are a plurality of depending flaps extending from the bottom of the side walls which are securable together to form the bottom of the container and which permit shipment of the container in a collapsed condition to its point of initial use.

14. A hanging garment containers, as claimed in claim 1, further comprising:
(a) an integral, access flap in one side wall of the container which permits easy access to the interior of the container; and
(b) a lid for enclosing the top of the container having depending side panels.

15. A hanging garment container comprising:
(a) a panel structure forming a front wall, a rear wall and a pair of opposite side walls connecting the front and rear walls and having a connected planar bottom structure for the container to create an open top container;
(b) a hanging garment support structure including a horizontal support member extendable across the top of the open top container between opposite side walls;
(c) a pair of vertical support members each for supporting an opposite end of the horizontal member and each supportable on the bottom of the open to container at their lower ends; and
(d) means for securing the ends of the horizontal member to the side walls to prevent relative movement and for securing the tops of the vertical members to prevent relative movement wherein the support member securement means includes a pair of juxtaposed elements secured to the interior of the side wall of the container, each element having a first interior edge portion which is opposed to the other and together define a slot for closely receiving a vertical support member to secure it against relative movement, and each element having a second interior edge portion which is opposed to the other defining a slot for closely receiving the end of the horizontal support member to secure it against relative movement.

16. A hanging garment container, as claimed in claim 15, wherein the securement elements are composed of a deformable, resilient material which will deform to receive the support members and resiliently engage their surfaces after insertion into the slots to captively hold them.

17. A hanging garment container, as claimed in claim 16, wherein the panel structure, forming the open top container is made of corrugated board and wherein the securement elements are of multi-layered corrugated board secured to the interior side wall of the container.

18. A hanging garment container, as claimed in claim 1, wherein the support member securement means comprises a bracket having a panel positionable on the interior of a side wall of the container, means for securing the bracket panel to the side wall of the container including an integral member engaging the side wall, and a pair of vertically aligned, spaced tabs connected to the bracket panel which project outwardly from the panel, each having ends turned inwardly toward the ends of the other to form an enclosure which captively receives a vertical support member.

19. A hanging garment container, as claimed in claim 18, wherein the horizontal support member is narrower in its transverse dimension than the vertical member and wherein the tabs have sections which closely receive opposite sides of a vertical support member and wherein the ends of the tabs which project toward each other are spaced to closely receive the opposite sides of the horizontal support member.

20. A hanging garment container, as claimed in claim 19, wherein the ends of the tabs which project inward include teeth which engage opposite side surfaces of the horizontal support member to captively secure the horizontal support member.

21. A hanging garment container, as claimed in claim 20, wherein the tabs integrally depend from the panel to which they are connected.

22. A hanging garment container, as claimed in claim 18, wherein the support member securement bracket further includes a horizontally aligned tab which is connected to and projects out from the bracket panel between the opposing tabs and having at least one prong thereon which projects downward to engage the top of the vertical support member and at least one prong thereon which projects upward to engage the horizontal support member to secure them against relative movement.

23. A hanging garment container, as claimed in claim 1, wherein the support member securement means comprises a bracket having a panel positionable on the interior of a side wall of the container, means for securing the bracket panel to the side wall of the containers, and a horizontally aligned tab which is connected to and projects out from the bracket panel and having a least one prong thereon which projects downward to engage the top of the vertical support member and at least one prong thereon which projects upward to engage the horizontal support member to secure them against relative movement.

24. A hanging garment container, as claimed in claim 1, wherein the support member securement means comprises a bracket having a panel, positionable on the interior of a side wall of the container, means for securing the bracket panel to the side wall of the container, and a projection which is connected to and extends outward from the bracket plate and then downward to form a leg passable through the horizontal member and into the vertical member to secure them against relative movement.

25. A hanging garment container, as claimed in claim 24, wherein the downward leg of the projection has a tapered end to permit the projection to be driven into the top of the vertical support member.

26. A hanging garment container, as claimed in claim 24, wherein the projection is integral to the bracket panel.

27. A hanging garment container comprising:
   (a) a panel structure forming a front wall, a rear wall and a pair of opposite side walls connecting the front and rear walls and having a connected planar bottom structure for the container to create an open top container;
   (b) a hanging garment support structure including a horizontal support member extendable across the top of the open top container between opposite side walls;
   (c) a pair of vertical support members each for supporting an opposite end of the horizontal member and each supportable on the bottom of the open top container at their lower ends; and
   (d) means for securing the ends of the horizontal member to the side walls to prevent relative movement and for securing the tops of the vertical members to prevent relative movement wherein the support member securement means comprises a bracket having a planar body section securable to a side of a vertical support member, upper surfaces defining a slot between them for receiving the horizontal support member, transverse flanges connected to the planar body along opposite sides of the slot to stiffen the bracket and directed, slightly inward to clamp the sides of the horizontal support member, and means for securing the bracket to the vertical support member.

28. A hanging garment container, as claimed in claim 27, wherein the transverse flanges have a bottom edge for engagement against the top of a vertical support member.

29. A hanging garment container comprising:
   (a) a panel structure forming a front wall, a rear wall and a pair of opposite side walls connecting the front and rear walls and having a connected planar bottom structure for the container to create an open top container;
   (b) a hanging garment support structure including a horizontal support member extendable across the top of the open top container between opposite side walls;
   (c) a pair of vertical support members each for supporting an opposite end of the horizontal member and each supportable on the bottom of the open to container at their lower ends; and
   (d) means for securing the ends of the horizontal member to the side walls to prevent relative movement and for securing the tops of the vertical members to prevent relative movement wherein the support member securement means comprises a bracket having a planar body having upper wall sections defining a slot for closely receiving a horizontal support member, a transversely direct tab, positionable between the horizontal support member and a vertical support member including means for engaging the bottom of the horizontal support member and securing it against relative movement and means for engaging the top of the vertical support member and securing it against relative movement, a pair of oppositely positioned lateral transverse flanges connected to the sides of the body to stiffen the bracket and to closely receive the vertical support member, and means for securing the bracket to the vertical support member.

30. A hanging garment container, as claimed in claim 29, wherein the bracket is integrally formed with the tab forming the slot and having upwardly and downwardly projecting integral prongs for engaging the support members.

31. A bracket for use in connecting a horizontal member and a vertical member having ends which intersect adjacent to a wall structure, which comprises:
   (a) a plate suitable for engagement against the wall structure;
   (b) means for securing the plate to the wall structure; and
   (c) a tongue extending outward from the plate and having an opening therein for closely receiving an end of the horizontal member and having an outer end which engages the top of the vertical member.

32. A bracket for use in connecting a horizontal member and a vertical member having ends which intersect adjacent to a wall structure, as claimed in claim 31, wherein the tongue is centrally located on the bracket and extends angularly outward from the plate and has a down turned end which engages the top of the vertical member to engage a kerf formed therein.

33. A bracket for use in connecting a horizontal member and a vertical member having ends which intersect adjacent to a wall structure, as claimed in claim 31, wherein the tongue has a lower section along the bottom of the central opening which includes means for securing the horizontal member to prevent relative movement.

34. A bracket for use in connecting a horizontal member and a vertical member having ends which intersect adjacent to a wall structure, as claimed in claim 33, wherein the horizontal member securement means on the tongue comprises an integral prong which engages the horizontal member.

35. A bracket for use in connecting a horizontal member and a vertical member having ends which intersect adjacent to a wall structure, as claimed in claim 33, wherein the horizontal member securement means on the tongue comprises an upper edge of the lower section of the tongue defining a notch which has sloped corners which bind into the horizontal member.

36. A bracket for use in connecting a horizontal member and a vertical member having ends which intersect adjacent to a wall structure, as claimed in claim 31, wherein the tongue has a lower section which includes means for securing the vertical member to prevent relative movement.

37. A bracket for use in connecting a horizontal member and a vertical member having ends which intersect adjacent to a wall structure, as claimed in claim 36, wherein the vertical member securement means on the tongue comprises a lower edge of the lower section of the tongue which defines a notch having sloped sides which bind into the vertical member to prevent relative movement.

38. A bracket for use in connecting a horizontal member and a vertical member having ends which intersect adjacent to a wall structure, as claimed in claim 31, wherein the tongue on the bracket includes a section outwardly projecting from the panel and having a lateral opening therein for closely receiving an end of the horizontal member and a horizontal section connected to the outwardly projecting section and having an opening therein for closely receiving the top of a vertical support member.

39. A bracket for use in connecting a horizontal member and a vertical member having ends which intersect together and to an adjacent wall structure with the horizontal member having a narrower cross-section than the vertical member, which comprises:
(a) a plate suitable for engagement against the wall structure;
(b) means for securing the plate to the wall structure comprising a plate member spaced from and connected to the wall engagement plate for captively engaging the wall between such plates; and
(c) a pair of vertically aligned, spaced tabs connected to the plate which project outwardly from the panel, each having ends turned inwardly towards the ends of the other to form an enclosure which captively receives the vertical member and wherein the ends of the tabs are spaced to closely receive opposite sides of the horizontal member.

40. A bracket for use in connecting a horizontal member and a vertical member having ends which intersect adjacent to a wall structure with the horizontal member having a narrower cross-section than the vertical member, as claimed in claim 39, wherein the ends of the tabs which project inward include teeth which engage opposite side surfaces of the horizontal member to captively secure the horizontal member.

41. A bracket for use in connecting a horizontal member and a vertical member having ends which intersect adjacent to a wall structure with the horizontal member having a narrower cross-section than the vertical member, as claimed in claim 40, wherein the tabs are resilient to permit insertion of the horizontal member and to thereafter bias the teeth against the sides of the horizontal member to captively secure the horizontal member.

42. A bracket for use in connecting a horizontal member and a vertical member having ends which intersect adjacent to a wall structure with the horizontal member having a narrower cross-section than the vertical member, as claimed in claim 41, wherein the tabs integrally depend from the panel to which they are connected.

43. A bracket for use in connecting a horizontal member and a vertical member having ends which intersect adjacent to a wall structure with the horizontal member having a narrower cross-section than the vertical member, as claimed in claim 39, further including a horizontally aligned tab which is connected to and projects out from the plate between the opposing tabs and having at least one prong thereon which projects downward to engage the top of the vertical member and at least one prong thereon which projects upward to engage the horizontal member to secure them against relative movement.

44. A bracket for use in connecting a horizontal member and a vertical member having ends which intersect together and to an adjacent wall structure, which comprises:
(a) a plate suitable for engagement against the wall structure;
(b) means for securing the plate to the wall structure; and
(c) a horizontally aligned tab which is connected to and projects out from the plate and is positionable between the intersecting members and having at least one prong thereon which projects downward to engage the top of the vertical member and at least one prong thereon which projects upward to engage the horizontal support member to secure them against relative movement.

45. A bracket for use in connecting a horizontal member having a vertical passage therethrough near its end and a vertical member, the members intersecting adjacent to a wall structure, which comprises:
(a) a plate suitable for engagement against the wall of the structure;
(b) means for securing the plate to the wall structure; and
(c) a projection which is connected to and extends outward from the plate and then downward to form a leg passable through the hole in the horizontal member and into the vertical member to secure them against relative movement.

46. A bracket for use in connecting a horizontal member having a vertical passage therethrough near its end and a vertical member, the members intersecting adjacent to a wall structure, as claimed in claim 45, wherein the downward leg of the projection has a tapered lower end to permit the projection to be driven into the top of the vertical member.

47. A bracket for use in connecting a horizontal member having a vertical passage therethrough near its end and a vertical member, the members intersecting adjacent to a wall structure, as claimed in claim 46, wherein the projection is integral to the plate.

48. A bracket for use in connecting a horizontal member and a vertical member having ends which intersect, which comprises;
(a) a planar body section securable to a side of the vertical member with upper surfaces defining a slot between them for receiving the horizontal member;
(b) transverse flanges connected to the planar body along opposite sides of the slot to stiffen the bracket and directed, slightly inwardly to clamp the sides of the horizontal member; and
(c) means for securing the bracket to the vertical support member.

49. A bracket for use in connecting a horizontal member and a vertical member having ends which intersect, as claimed in claim 48, wherein the transverse flanges have a bottom edge for engagement against the top of the vertical support member.

50. A bracket for use in connecting a horizontal member and a vertical member having ends which intersect, which comprises:
(a) a planar body having upper wall sections defining a slot for closely receiving the horizontal member;
(b) a transversely directed, horizontally aligned tab connected to the body positionable between the horizontal member and vertical member including means for engaging the bottom of the horizontal member and securing it against relative movement and means for engaging the top of the vertical member and securing it against relative movement;
(c) a pair of oppositely positioned lateral transverse flanges connected to the side of the body to stiffen the bracket and to closely receive the vertical member; and (d) means for securing the bracket to the vertical member.

51. A bracket for use in connecting a horizontal member and a vertical member having ends which intersect, as claimed in claim 50, wherein the bracket is integrally formed with a tab forming the slot and having upwardly and downwardly projecting integral prongs on the tab for engaging the support members.

* * * * *